United States Patent
Akiyama

[11] Patent Number: 5,857,367
[45] Date of Patent: Jan. 12, 1999

[54] BRAZING METHOD

[75] Inventor: Shoji Akiyama, Konan-machi, Japan

[73] Assignee: Zexel Corporation, Tokyo, Japan

[21] Appl. No.: 761,383

[22] Filed: Dec. 9, 1996

[30] Foreign Application Priority Data

Dec. 12, 1995 [JP] Japan .................................. 7-346346

[51] Int. Cl.$^6$ ...................................................... B21D 5/14
[52] U.S. Cl. .................................. 72/42; 72/46; 228/223
[58] Field of Search .......................... 72/46, 42; 228/43, 228/173.2, 173.7, 223, 224

[56] References Cited

U.S. PATENT DOCUMENTS

| | | | |
|---|---|---|---|
| 153,090 | 7/1874 | Lamb | 228/223 |
| 2,414,511 | 1/1947 | Dyar | 228/223 |
| 3,756,489 | 9/1973 | Chartet | 228/43 |
| 3,899,625 | 8/1975 | Izumi et al. | 72/46 |
| 3,973,322 | 8/1976 | Boynton | 228/223 |

*Primary Examiner*—Lowell A. Larson
*Attorney, Agent, or Firm*—Birch, Stewart, Kolasch & Birch, LLP

[57] ABSTRACT

In a brazing method, a flux-mixed liquid is prepared by mixing a brazing flux with a quick-drying oil. The flux-mixed liquid, when it is spread to an aluminum or aluminum alloy work, fixes the brazing flux to the work by a quick-drying character of the quick-drying oil within a short time. Also, in the brazing method, the flux-mixed liquid is prepared by mixing the brazing flux with an aqueous solution in which a solid lubricant is melted in water. The solid lubricant melts in water at or above a prescribed temperature, and forms a film when the temperature is below the prescribed temperature. The flux-mixed liquid, when it is spread to the work, immediately forms the film due to a drop in temperature below the prescribed temperature and fixes the brazing flux to the work by the film within a short time.

18 Claims, 5 Drawing Sheets

BRAZING METHOD

BACKGROUND OF THE INVENTION

The present invention relates on a brazing method for an aluminum or aluminum alloy work.

As methods for spreading a brazing to an aluminum or aluminum alloy work, a method utilizing electrostatic induction and a method by which a brazing flux dissolved in water is sprayed are known. In the case of the method utilizing electrostatic induction, the work is electrically grounded and a powdered brazing flux is charged by electrostatic induction. The charged brazing flux is carried to the work by a coulomb force, and thereby the brazing flux is spread to the work. In the case of the method by which a brazing flux dissolved in water is sprayed, a flux-mixed liquid is prepared by mixing a powdered brazing flux with water, and the flux-mixed liquid is sprayed to the work. After spraying, drying (for example, at 140° C. for 5 minutes) is performed, and thereby the brazing flux is fixed to the work.

FIG. 6 is a perspective view showing an example of a flat tube used for a heat exchanger of an air-conditioning system. A flat tube 1 is composed of a one-piece sheet made of an aluminum alloy. In the flat tube 1, there are formed three coolant paths 5, 6 and 7 by brazing inside faces of embossed portions 2, 3 and an inside face of an end portion 4. Flat tubes 1 like this are produced by continuously forming a rolled aluminum alloy sheet by an endless processing and cutting it into individual flat tubes in the final stage of forming.

In the case of a flat tube like this, it is not possible to spread the brazing flux to inside faces of the embossed portions 2, 3 and inside face of the end portion 4 after the flat tube 1 is formed as shown in FIG. 6. For this reason, it is necessary to spread the brazing flux in the middle of forming the flat tube 1. However, the method utilizing electrostatic induction cannot be used for spreading the brazing flux in the middle of forming. That is, since the work is electrically grounded and the brazing flux is charged for spreading in the method utilizing electrostatic induction, it is necessary to conduct the spreading of the brazing flux separately, or as an independent process, after cutting flat tubes 1 into individual pieces. Accordingly, it is physically not possible to incorporate the spread of the brazing flux into the endless process. In addition, since the brazing flux is spread in a dry state, the fixing character of the brazing flux is not so good. On the other hand, in the case of the method by which a brazing flux dissolved in water is sprayed, the work must be dried and in order to fix the brazing flux on the work after the spread of the flux-mixed liquid. Hence, when the spread of the brazing flux is incorporated into the endless process, a drying time is required, and the result is an adverse effect to the speed of forming the flat tubes 1.

SUMMARY OF THE INVENTION

It is an object, therefore, of the present invention to overcome the disadvantages and limitations of the above-noted conventional brazing method by providing a new and improved brazing method.

Another object of the present invention is to provide a brazing method by which a brazing flux can be fixed to a work within a short time and the brazing flux can be continuously spread to the work.

Still another object of the present invention is to provide a brazing method by which the spreading of a brazing flux can be performed in the middle of forming a work without spoiling the speed of forming the work.

The above and other objects are attained by a brazing method for spreading a brazing flux to an aluminum or aluminum alloy work in order to braze the work, comprising the steps of: preparing a flux-mixed liquid by mixing the brazing flux with a quick-drying oil; and spreading the flux-mixed liquid to the work and fixing the brazing flux to the work by a quick-drying character of the quick-drying oil within a short time.

According to a composition like this, the flux-mixed liquid which is prepared by mixing the brazing flux with the quick-drying oil is spread to an aluminum or aluminum alloy work. Hence, the brazing flux can be fixed to the work within a short time by the quick-drying character of the quick-drying oil. Also, it is possible to continuously spread the flux-mixed liquid to the work by dipping or spraying. Therefore, even when the brazing flux is spread in the middle of an endless processing of the work, a speed of forming the work is not spoiled.

Also, the above and other objects are attained by a brazing method for spreading a brazing flux to an aluminum or aluminum alloy work in order to braze the work, comprising the steps of: preparing a flux-mixed liquid by mixing the brazing flux with an aqueous solution in which a solid lubricant is melted in water, said solid lubricant melting in water at or above a prescribed temperature, and said solid lubricant forming a film in order that temperature is below said prescribed temperature when the flux-mixed liquid is spread to the work; and spreading the flux-mixed liquid to the work and fixing the brazing flux with the film of the solid lubricant within a short time.

According to a composition like this, the flux-mixed liquid which is prepared by mixing the brazing flux with the aqueous solution of the solid lubricant is spread to an aluminum or aluminum alloy work. The solid lubricant melts in water at or above the prescribed temperature, and forms a film in order that temperature is below the prescribed temperature when the flux-mixed liquid is spread to the work. Accordingly, the film is formed immediately when the flux-mixed liquid is spread to the work, and the brazing flux can be fixed to the work with the film within a short time. Also, it is possible to continuously spread the flux-mixed liquid to the work by dipping or spraying. Therefore, even when the brazing flux is spread in the middle of an endless processing of the work, a speed of forming the work is not spoiled.

Further scope of application of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will be appreciated and better understood by means of the following description and accompanying drawings, which are given by way of illustrations only and thus are not limitative of the present invention and wherein.

DETAILED DESCRIPTION OF THE INVENTION

Figure 1:
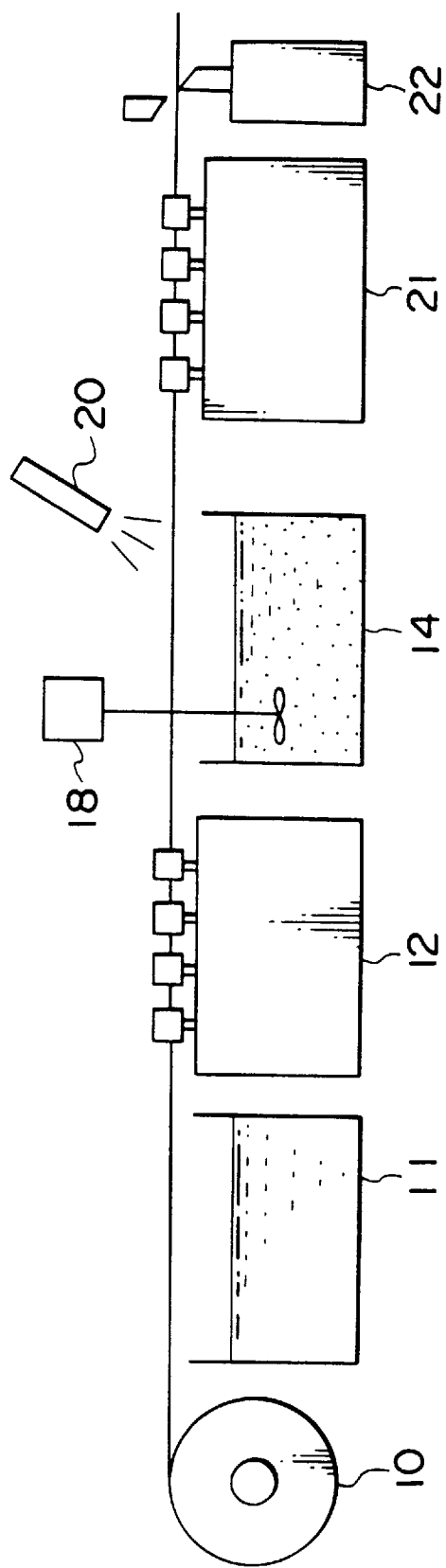
FIG. 1 is a forming process flow diagram showing an embodiment of a brazing method according to the present invention.
Figure 6:
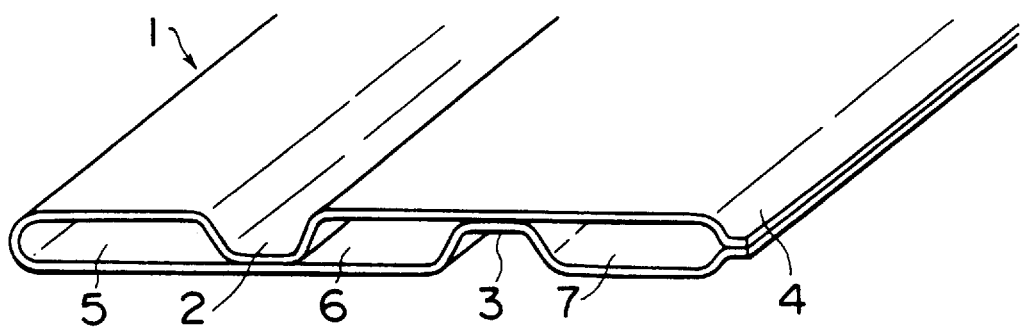
FIG. 6 is a perspective view showing an example of a flat tube used for a heat exchanger of an air-conditioner.

FIG. 1 is the forming process flow diagram showing one embodiment of the brazing method according to the present invention and shows the forming process of the flat tube 1 of FIG. 6.

In FIG. 1, a reference numeral 10 is a rolled brazing sheet. The brazing sheet 10 is a three-layer thin sheet formed with a core member made of a first aluminum alloy (a A3000 type aluminum alloy) and a skin member (a A4000 type aluminum alloy). From the brazing sheet 10 like this, the flat tube 1 of FIG. 6 are continuously formed by an endless processing mentioned later.

Figure 2A:
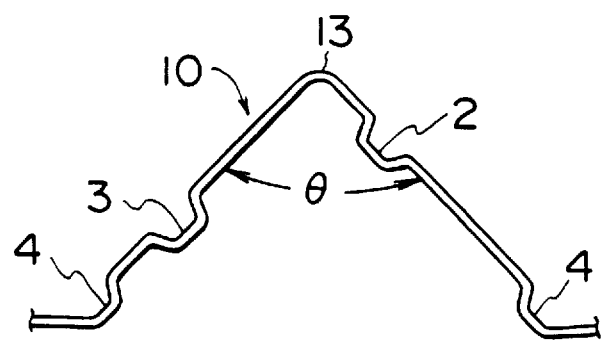
FIG. 2(a) and FIG. 2(b) are explanatory drawings for explaining forming procedures in the forming process of FIG. 1.

A reference numeral 11 is a first tank. In the first tank 11, a quick-drying oil is filled. This quick-drying oil is the same as the quick-drying oil used for the flux-mixed liquid mentioned later. Prior to forming the brazing sheet 10, the quick-drying oil, as a processing oil, is spread to the brazing sheet 10 by dipping or spraying in the first tank 11. Thereafter, the brazing sheet 10 is sent to a first forming process 12. In the first forming process 12, as shown in FIG. 2 (a), embossed portions 2, 3 and end portions 4, 4 are formed in the brazing sheet 10, and, a center portion 13 between the end portions 4, 4 is bent to a V-shape having an angle θ with a prescribed radius of curvature. The angle θ is about 90° from the viewpoint of spreading a brazing flux to the inside of the embossed portions 2, 3 and the end portions 4, 4. After the embossed portions 2, 3 and the end portions 4, 4 are formed and the V-shape is formed, the brazing sheet 10 is sent to a second tank 14 where the brazing flux is spread. In the second tank 14, a flux-mixed liquid, prepared by mixing a powdered brazing flux with the quick-drying oil, is filled.

Figure 3:
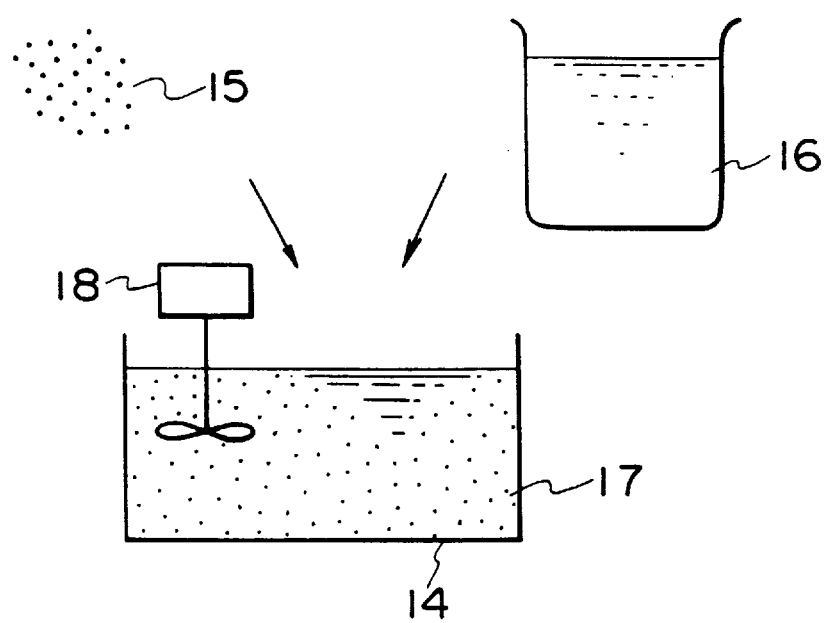
FIG. 3 is an explanatory drawing showing a composition of a flux-mixed liquid of FIG. 1.

FIG. 3 is the explanatory drawing for explaining the composition of the flux-mixed liquid filled in the second tank 14. The flux-mixed liquid 17 is prepared by mixing a powdered brazing flux 15 with a quick-drying oil 16. The quick-drying oil 16 reaches a sufficient dry condition to fix the brazing flux 15 to the brazing sheet 10 within a short time by its quick-drying character. Further, exposed to blown 50° to 60° C. hot air, the quick-drying oil 16 reaches the sufficient dry condition to fix the brazing flux 15 to the brazing sheet 10 in a few seconds. As the quick-drying oil 16, for example, Idemitsu Punch Oil AF-2AS or AF-2A produced by Idemitsu Kosan Co., Ltd. are available. Additionally, a reference numeral 18 is an agitator, by which a uniformly mixed condition of the brazing flux 15 is maintained.

In the second tank 14 of FIG. 1, the flux-mixed liquid 17 is spread to the brazing sheet 10 by dipping or spraying. Since the brazing sheet 10 is spread with the flux-mixed liquid 17 under the V-shaped bent condition, the flux-mixed liquid 17 is thoroughly spread to the inside faces of embossed portions 2, 3 and the inside faces of end portions 4, 4. The spread brazing flux 15 is fixed by the quick-drying character of the quick-drying oil 16 within a short time. A reference numeral 20 in FIG. 1 is a hot-air blower. The hot-air blower 20 provides a 50° to 60° C. hot air to the brazing sheet 10 which is spread with the flux-mixed liquid 17. Thereby, the drying of the quick-drying oil 16 is further promoted, and the brazing flux 15 is fixed more quickly. Since the flux-mixed liquid 17 is agitated by the agitator 18, a fixenspot of the brazing flux 15 can be prevented.

Figure 2B:
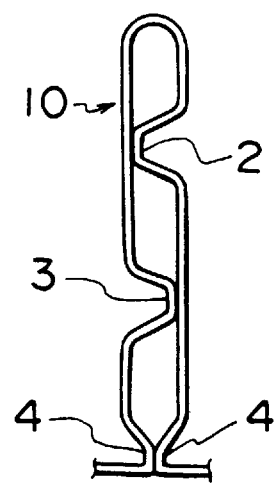

After the brazing flux 15 is fixed, the brazing sheet 10 is sent to a second forming process 21. In the second forming process 21, as shown in FIG. 2(b), the brazing sheet 10 is bent so that the embossed portions 2, 3 come into contact with opposing faces and the end portions 4, 4 come into contact with each other. In this case, a lubricating character of the quick-drying oil 16 which was spread as the flux-mixed liquid 17 functions as a processing oil. Accordingly, there is no need to separately spread a processing oil to the brazing sheet 10.

Thereafter, the brazing sheet 10 is cut into each flat tube by a cutter 21. Thereby, the flat tube 1 spread with the brazing flux 15 to inside faces of the embossed portions 2, 3 and end portions 4, 4, shown in FIG. 6, is given. As it is known well, the individually cut flat tubes 1, are assembled with fin members, incorporated into header pipes, and heated to a brazing temperature. Thereby, the flat tubes 1 are brazed at inside faces of the embossed portions 2, 3 and end portions 4, 4.

Figure 4:
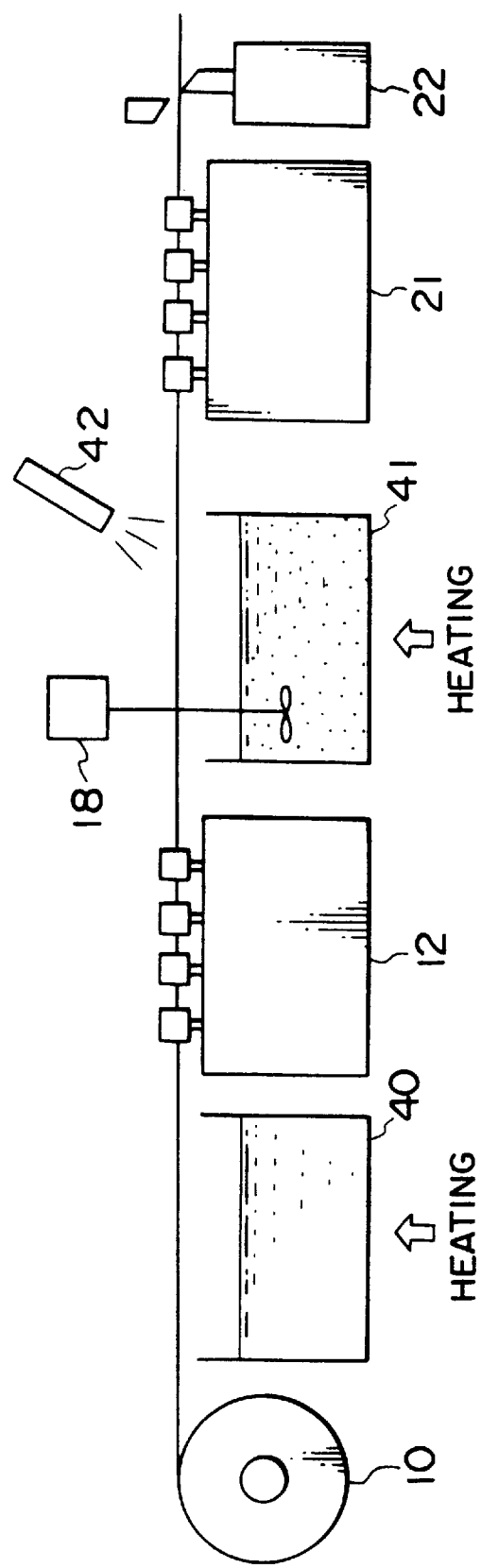
FIG. 4 is a forming process flow diagram showing another embodiment of a brazing method according to the present invention.

FIG. 4 is the forming process flow diagram showing another embodiment of the brazing method according to the present invention. In the embodiment of FIG. 4, a first tank 40 replaces the first tank 11 of FIG. 1, a second tank 41 replaces the second tank 14 of FIG. 1, and an air-knife 42 is provided instead of the hot-wind blower 20 of FIG. 1. The other arrangement is the same as that of the embodiment of FIG. 1.

Figure 5:
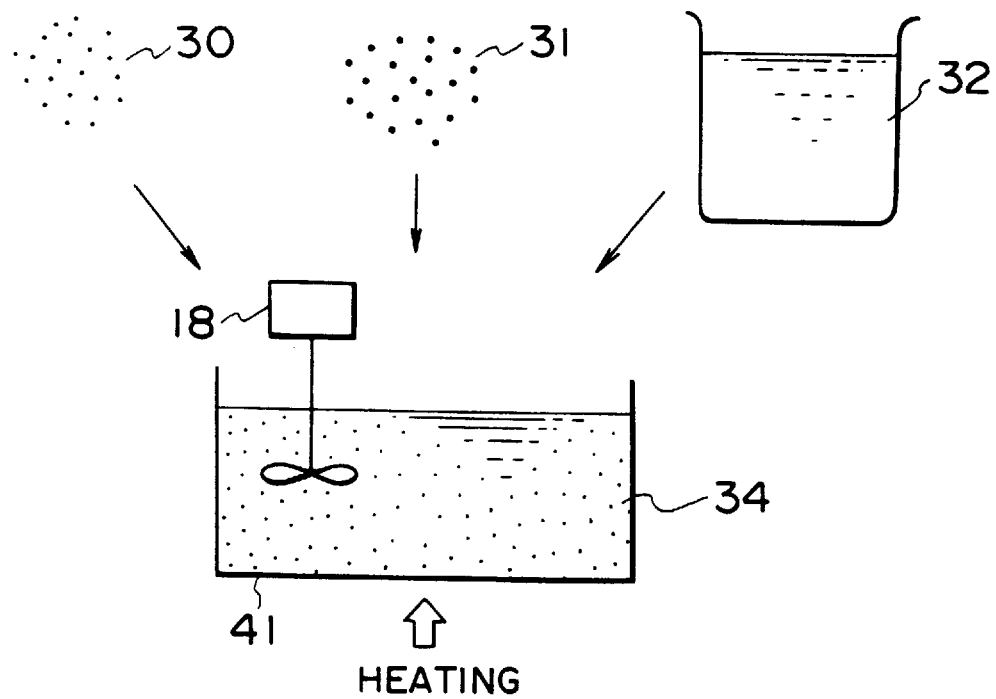
FIG. 5 is an explanatory drawing for explaining a composition of a flux-mixed liquid of FIG. 4.

FIG. 5 is the explanatory drawing for explaining the composition of the flux-mixed liquid filled into the second tank 41. In FIG. 5, a reference numeral 30 is a powdered brazing flux, a reference numeral 31 is a powdered solid lubricant, and a reference numeral 32 is water. A main ingredient of the solid lubricant 31 is an alkali metal salt of a fatty acid. The solid lubricant 31 melts in water when it is heated to about 70° C. and higher. When an aqueous solution in which the solid lubricant 31 is melted is spread to a work by dipping or spraying, immediately a film is formed over the work surface because the temperature drops below 70° C. Particularly in the case of the flat tube 1, as the flat tube 1 is a thin aluminum alloy sheet having a wide area, the aqueous solution in which the solid lubricant 31 is melted forms the film immediately after spreading. As the solid lubricant 31, for example, Water Film produced by Nihon Parkerizing Co., Ltd. is available. A flux-mixed liquid 34 is prepared by mixing the brazing flux 30 with the aqueous solution in which the solid lubricant 31 is melted. The flux-mixed liquid 34 like this is filled in the second tank 41.

In the first tank 40, the aqueous solution in which the solid lubricant 31 is melted in water is filled.

The aqueous solution of the first tank 40 and the flux-mixed liquid 34 of the second tank 41 are heated above said temperature so as to maintain the melted condition of the solid lubricant 31. The flux-mixed liquid 34 of the second tank 41 is agitated by the agitator 18 so that a uniformly mixed condition of the brazing flux 30 can be maintained. The air-knife 42 blows room-temperature air to the brazing sheet 10 after the flux-mixed liquid 34 is spread to the brazing sheet 10 by dipping or spraying in the second tank 41. Thereby, a moisture content of the spread flux-mixed liquid 34 is removed.

Prior to forming the brazing sheet 10, the aqueous solution in which the solid lubricant 31 is melted is spread to the brazing sheet 10 by dipping or spraying in the first tank 40. Thereby, a film of the solid lubricant 31 is formed over the brazing sheet 10, and a lubricating character of the film functions as a processing oil in forming in the first forming process 12. When the brazing sheet 10 is sent from the first forming process 12 to the second tank 41, the flux-mixed liquid 34 is spread to the brazing sheet 10 by dipping or spraying. When the flux-mixed liquid 34 is spread, the solid lubricant 31 immediately forms a film due to a drop in temperature. The brazing flux 30 is fixed by the film of the solid lubricant 31 within a short time. Since a moisture content is removed by the air-knife 42 after the flux-mixed liquid 34 is spread, the fixing time of the brazing flux 30 is further shortened. Since the flux-mixed liquid 34 is agitated by the agitator 18, a fixenspot of the brazing flux 30 can be prevented. Thereafter, the brazing sheet 10 is sent to the second forming process 21. In this forming process, the lubricating character of the film of the solid lubricant 32 formed by spreading the flux-mixed liquid 34 functions as a processing oil. Other processes are the same as those described with regard to FIG. 1, FIG. 2(*a*) and FIG. 2(*b*).

Since the flat tube 1 is heated to the brazing temperature without washing after being assembled as a heat exchanger, a residue of the quick-drying oil 16 or the solid lubricant 31 is left. However, since the quick-drying oil 16 and the solid lubricant 31 are organic matters, the brazing character is not degraded. When an inorganic matter is used as an additive for the quick-drying oil 16 and the solid lubricant 31, an additive which is not activated at high temperatures is used so that the brazing character is not spoiled.

Although, in the above-mentioned embodiments, the quick-drying oil 16 or the solid lubricant 31 functions as a processing oil of the first forming process 12 in the first tanks 11 or 40, the work may be dry-formed without providing the first tanks 11 and 40. Also, in the above-mentioned embodiments, a flux spreading process is incorporated in the forming process, but this is not intended to limit the scope of the invention. The flux spreading process may be provided as a separate process or an independent process.

As described above in detail, according to the first embodiment, the flux-mixed liquid in which the brazing flux is mixed with the quick-drying oil is spread to the aluminum or aluminum alloy work. When the flux-mixed liquid is spread to the work, the brazing flux is fixed by its quick-drying character. Moreover, it is possible to continuously spread the brazing flux by dipping or spraying. Therefore, even when the brazing flux is spread in the middle of the endless processing of the work, the speed of forming the work is not spoiled. Further, since it is possible to make the lubricating character of the quick-drying oil function as a processing oil in forming the work, there is no need to separately apply a processing oil. Thereby, it is possible to provide simplification in the production aspect.

According to the second embodiment, the flux-mixed liquid in which the brazing flux is mixed with the aqueous solution in which the solid lubricant is melted is spread to the aluminum or aluminum alloy work. When the flux-mixed liquid is spread to the work, the solid lubricant immediately forms a film, and the brazing flux is fixed with the film within a short time. Moreover, it is possible to continuously spread the brazing flux by dipping or spraying. Therefore, even when the brazing flux is spread in the middle of an endless processing of the work, the speed of forming the work is not spoiled. Further, since it is possible to make the lubricating character of the solid lubricant function as a processing oil in forming the work, there is no need to separately spread a processing oil. Thereby, it is possible to provide simplification in the production aspect.

From the foregoing it will now be apparent that a new and improved brazing method has been found. It should be understood of course that the embodiments disclosed are merely illustrative and are not intended to limit the scope of the invention. Reference should be made to the appended claims, rather than the specifications as indicating the scope of the invention.

What is claimed is:

1. A method for spreading a brazing flux on an aluminum or aluminum alloy work in order to braze the work, comprising the steps of:

(a) preparing a flux-mixed liquid by mixing the brazing flux with a quick-drying oil, the quick-drying oil reaching a sufficient dry condition to fix the brazing flux to the work in about several seconds by exposure to hot air of about 50° C.–60° C. when the flux-mixed liquid is spread on the work; and (b) spreading the flux-mixed liquid on the work, drying the quick-drying oil by providing hot air of about 50° C.–60° C. to the work, and thereby fixing the brazing flux to the work in about several seconds.

2. The method of claim 1, wherein step (b) includes agitating the flux-mixed liquid so that a mixing condition of the brazing flux is uniform, and spreading the flux-mixed liquid on the work by dipping or spraying.

3. The method of claim 1, wherein steps (a) and (b) are incorporated into a forming process of the work, in which a lubricating character of the fluxmixed liquid functions as a processing oil without depositing the processing oil on the work in forming the work which is spread with the flux-mixed liquid.

4. A method for spreading a brazing flux on an aluminum or aluminum alloy work in order to braze the work, comprising the steps of:

(a) providing a first forming process for forming two end portions and at least one embossed portion between the end portions in the work in order to form a flat tube having a plurality of paths, and bending the work to a V-shape at a center portion between the end portions;

(b) spreading a flux-mixed liquid, which is prepared by mixing the brazing flux with a quick-drying oil, on at least an inside face of the work which is bent to the V-shape, and fixing the brazing flux to the work by a quick-drying character of the quick-drying oil within a short time; and (c) providing a second forming process for forming the work, which is spread with the flux-mixed liquid, by making a lubricating character of the flux-mixed liquid function as a processing oil, the second forming process bending the work still more so that the end portions come into contact with each other and the embossed portion comes into contact with an opposite face, and forming the flat tube.

5. The method of claim 4 further including the step of (d) spreading the quick-drying oil, with which the brazing flux is not mixed, on the work as the processing oil for the first forming process prior to step (a).

6. The method of claim 4, wherein the quick-drying oil of step (b) reaches a sufficient dry condition to fix the brazing flux to the work in about several seconds by exposure to hot air of about 50° C.–60° C. when the flux-mixed liquid is spread to the work;

and wherein the step (b) includes drawing the quick-driving oil by providing hot air of about 50° C.–60° C. to the work in order to fix the brazing flux to the work after the flux-mixed liquid is spread on the work.

7. The method of claim 4, wherein step (b) includes agitating the flux-mixed liquid so that a mixing condition of the brazing flux is uniform, and spreading the flux-mixed liquid to the work by dipping or spraying.

8. The method of claim 4, wherein the work is a rolled brazing sheet, and the steps (a), (b) and (c) continuously form flat tubes in which the brazing flux is fixed to at least an inside face of each flat tube by the quick-drying oil.

9. A method for spreading a brazing flux on an aluminum or aluminum alloy work in order to braze the work, comprising the steps of:

(a) preparing a flux-mixed liquid by mixing the brazing flux with an aqueous solution in which a solid lubricant is melted in water, said solid lubricant melting in water above a prescribed temperature and forming a film by reason of the fact that the temperature is below the prescribed temperature when the flux-mixed liquid is spread to the work, said flux-mixed liquid being kept above the prescribed temperature so as to maintain the melted condition of the solid lubricant; and (b) spreading the flux-mixed liquid to the work, the temperature of the flux-mixed liquid being rapidly lowered by spreading to the work, the flux-mixed liquid forming a film, and the brazing flux being fixed to the work by the film, and forming the work in which a lubricating character of the film by the solid lubricant functions as a processing oil without depositing processing oil on the work.

10. The method of claim 9, wherein a main ingredient of said solid lubricant is an alkali metal salt of a fatty acid, and said prescribed temperature is about 70° C.

11. The method of claim 9, wherein step (b) includes blowing room temperature air to the work for removing a moisture content after the flux-mixed liquid is spread to the work.

12. The method of claim 9, wherein step (b) includes agitating the flux-mixed liquid so that a mixing condition of the brazing flux is uniform, and spreading the flux-mixed liquid to the work by dipping or spraying.

13. A method for spreading a brazing flux on an aluminum or aluminum alloy work in order to braze the work, comprising the steps of:

(a) providing a first forming process for forming two end portions and at least one embossed portion between the end portions in the work in order to form a flat tube having a plurality of paths, and bending the work to a V-shape at a center portion between the end portions;

(b) spreading a flux-mixed liquid, which is prepared by mixing the brazing flux with an aqueous solution in which a solid lubricant is melted in water, to at least an inside face of the work which is bent to the V-shape, said solid lubricant melting in water above a prescribed temperature, by reason of the fact that the temperature is below the prescribed temperature when the flux-mixed liquid is spread on the work, and fixing the brazing flux to the work by a film, said flux-mixed liquid being kept above the prescribed temperature so as to maintain the melted condition of the solid lubricant; and (c) providing a second forming process for forming the work, which is spread with the flux-mixed liquid, by making a lubricating character of the film function as a processing oil, the second forming process bending the work still more so that the end portions come into contact with each other and the embossed portion comes into contact with an opposite face, and forming the flat tube.

14. The method of claim 13, wherein a main ingredient of said solid lubricant is an alkali metal salt a of fatty acid, and said prescribed temperature is about 70° C.

15. The method of claim 13 further including the step of (d) spreading the aqueous solution, in which the solid lubricant is melted in water, on the work as the processing oil for the first forming process prior to step (a), said aqueous solution being kept above the prescribed temperature so as to maintain the melted condition of the solid lubricant.

16. The method of claim 13, wherein step (b) includes blowing room temperature air to the work for removing a moisture content after the flux-mixed liquid is spread to the work.

17. The method of claim 13, wherein step (b) includes agitating the flux-mixed liquid so that a mixing condition of the brazing flux is uniform, and spreading the flux-mixed liquid to the work by dipping or spraying.

18. The method of claim 13, wherein the work is a rolled brazing sheet, and steps (a), (b) and (c) continuously form flat tubes in which the brazing flux is fixed to at least an inside face of each flat tube by the film of the solid lubricant.

* * * * *